(12) United States Patent
Gao et al.

(10) Patent No.: US 8,292,282 B2
(45) Date of Patent: Oct. 23, 2012

(54) FLEXIBLE SUPPORT ASSEMBLY FOR VEHICLE TOOLING PLATES

(75) Inventors: Dalong Gao, Troy, MI (US); Samuel P. Marin, Oakland Township, MI (US); Shelia A. Marin, legal representative, Oakland Township, MI (US); Roland J. Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 924 days.

(21) Appl. No.: 12/328,910

(22) Filed: Dec. 5, 2008

(65) Prior Publication Data

US 2010/0140860 A1 Jun. 10, 2010

(51) Int. Cl.
*B25B 11/00* (2006.01)

(52) U.S. Cl. .............................. 269/311; 269/32; 269/27

(58) Field of Classification Search .................... 269/32, 269/24–27, 228, 311
See application file for complete search history.

(56) References Cited

U.S. PATENT DOCUMENTS

| | | | | |
|---|---|---|---|---|
| 1,893,728 A * | 1/1933 | Bullis | ........................... | 254/102 |
| 2,243,905 A * | 6/1941 | Hubschneider | ............... | 269/311 |
| 2,861,485 A * | 11/1958 | Padavano | ...................... | 269/309 |
| 4,184,669 A * | 1/1980 | Bald | ............................. | 269/309 |
| 5,013,015 A * | 5/1991 | Fatheree | ........................ | 269/24 |
| 5,123,629 A * | 6/1992 | Takeuchi | ...................... | 254/103 |
| 5,634,253 A * | 6/1997 | Swann | ......................... | 29/281.1 |
| 5,664,762 A * | 9/1997 | Rothbauer | .................... | 254/103 |
| 5,788,225 A * | 8/1998 | Iwata et al. | ................... | 269/309 |
| 6,371,469 B1 * | 4/2002 | Gray | ............................ | 269/48.1 |
| 6,499,722 B1 * | 12/2002 | Kawasaki | .................... | 254/103 |
| 7,036,810 B2 * | 5/2006 | Wal, III | ........................ | 269/296 |
| 7,364,147 B2 * | 4/2008 | Shinozaki | .................... | 269/266 |
| 2003/0001144 A1 * | 1/2003 | Kubota | ......................... | 254/103 |

* cited by examiner

*Primary Examiner* — Lee D Wilson
(74) *Attorney, Agent, or Firm* — Quinn Law Group, PLLC

(57) ABSTRACT

The present invention provides a flexible support assembly for supporting and/or locating a fixture on a tooling plate. The support assembly includes a stanchion with a bore, and a threaded portion on an inner-diameter surface thereof. A base plate is attached to, and configured to repositionably fix the stanchion to the tooling plate. A cylindrical sleeve with a threaded portion on an outer-diameter surface thereof is threadably engaged with the stanchion, whereby the sleeve is operable to telescope with respect to the stanchion between a first, lowest position and a second, highest position. A nut is threadably engaged with the sleeve to lock the sleeve at any predetermined position between the first and second positions. A locator pin is releasably engaged with the sleeve at a first end thereof. The locator pin has a protrusion projecting outward from a second opposing end thereof for engaging a pinhole in the fixture.

17 Claims, 2 Drawing Sheets

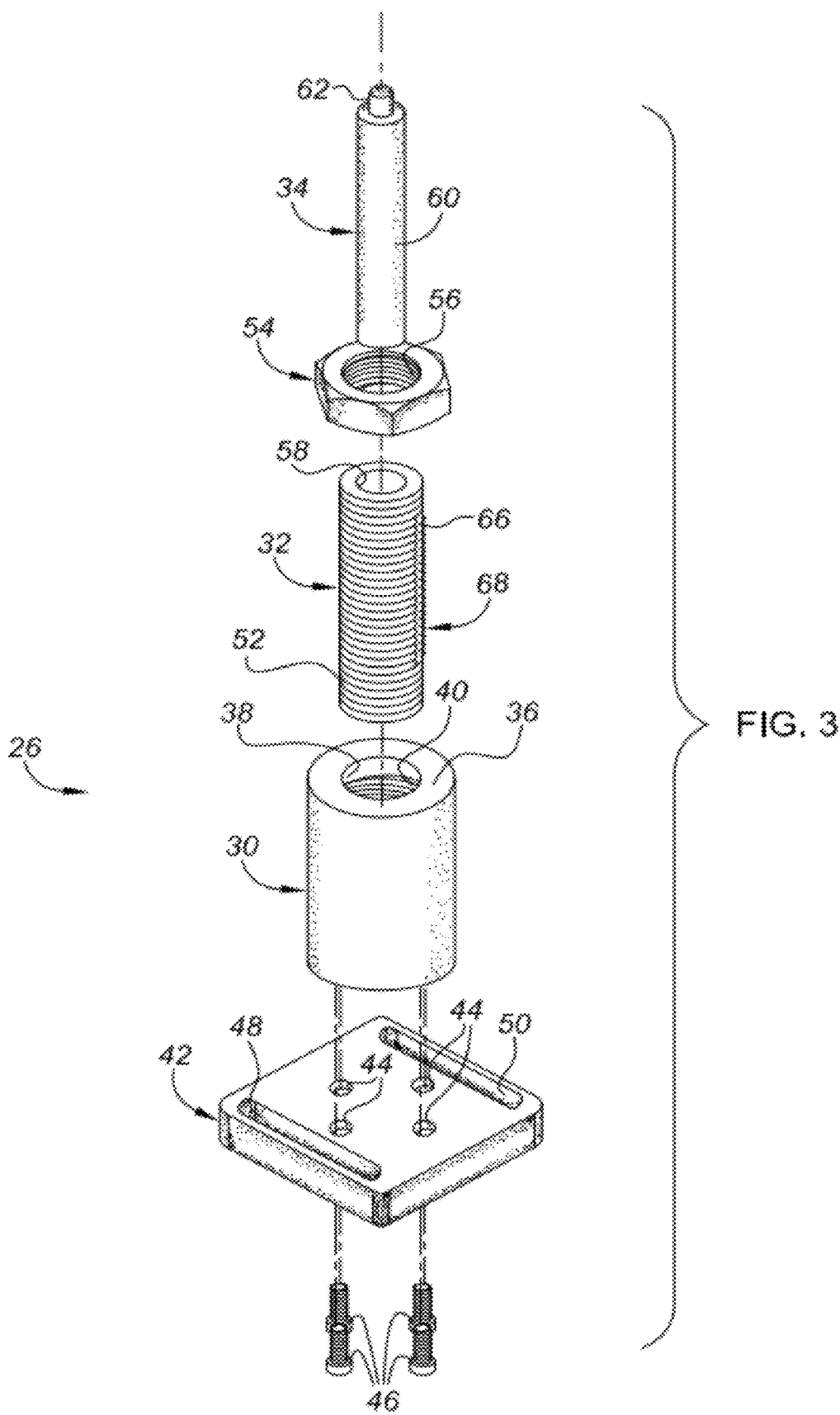

FLEXIBLE SUPPORT ASSEMBLY FOR VEHICLE TOOLING PLATES

TECHNICAL FIELD

The present invention relates generally to motor vehicle manufacturing and assembly operations, and more specifically to tooling plate supports used in vehicle body-chassis marriage applications.

BACKGROUND OF THE INVENTION

A contemporary motor vehicle, such as the modern-day automobile, consists of thousands of individual components. It has been, and remains conventional practice in the automotive industry for the vehicle body (or frame) to be built as an open structure into which are fitted and fixed all the constituent parts and equipment of the vehicle. A continuously moving conveyor, which is part of an overall mass production assembly line, carries the vehicle assembly through an assortment of work stations where various parts are fitted to the vehicle assembly to ultimately produce a completed vehicle.

In modern vehicle assembly operations, it is customary to preassemble the individual components of the vehicle chassis, such as the engine, transmission, differential, and suspension, before marrying them with the vehicle frame in a "Body-on-Frame" or "Body Frame Integral" construction. The vehicle frame is typically oriented using an overhead hanger-type conveyor system, whereas the chassis components are supported by a fixture pallet or tooling plate. One or more precision locating and lifting apparatuses operate to arrange the chassis components into position beneath the moving body, and raise the chassis components into position for assembly with the body. Once the locating apparatus lifts the part to an elevated position, it is secured to the vehicle body.

The vehicle body-chassis marriage application generally requires precision location of the constituent parts prior to the actual marrying with the vehicle frame. It may be desirable, for example, to support a particular component in an orientation which corresponds to its in-vehicle orientation, and in a manner which enables access to particular locations, such as bolt holes, used to attach the component to the vehicle. For instance, the vehicle engine or powertrain (e.g., engine plus transmission) may have specific support structures that are used for the purpose of presenting the engine or powertrain to the vehicle body in a manner which facilitates attachment of the engine or powertrain to the vehicle body.

In such applications, a static locating pin assembly may be employed to position and support the fixture (e.g., engine, transmission, differential, transfer case, etc.) to facilitate subsequent installation to the vehicle. Static locating pins are often used in collaboration with a tooling plate that is designed for setting and transporting fixtures and the like. Such plates conventionally include a base having a top surface with a plurality of accurately located slots or bolt holes formed therein. A typical locating pin assembly may include a static pin having a chamfered head, and a shaft that is rigidly attached to a base. The base, in turn, has a flange that is then either press fit or lock-screwed at a precise location along the locating surface of the tooling plate. The chamfered head of the locating pin is intended to locate and engage holes that are formed at pre-specified locations on the fixture to ensure proper orientation and support thereof.

Tooling plates used in high volume production applications are generally style dependent. As such, a change in vehicle configuration often requires a redesign and re-manufacture of the tooling plate. For example, the attachment points of the fixture and/or vehicle may vary within a single platform, or from platform to platform. Each variation may require its own tooling plate layout. Tooling plates are expensive and time consuming to manufacture because the plate material tends to be very expensive, and each opening must be very accurately located with relation to the other openings to ensure proper fixture orientation. In a similar respect, prior art support pins are of a fixed length, and thus must be replaced to accommodate new vehicle design specifications.

SUMMARY OF THE INVENTION

The present invention provides a flexible, low-cost support assembly for use in manufacturing and assembly operations, such as vehicle body-chassis marriage applications in high volume production plants. The height of the support assembly is readily adjustable, both manually and robotically, and the location of the stand can be easily and quickly modified. In addition, the support pin is easily interchangeable to allow for varying heights and pin-head configurations. The present design reduces pre-production lead time, as well as production and maintenance costs by eliminating the need for constructing numerous tooling plates and support assemblies for a single manufacturing line, and increasing the flexibility of the process.

According to one embodiment of the present invention, a support pin assembly for supporting and/or locating a fixture on a tooling plate is provided. The support pin assembly includes a stanchion member that is configured to fixedly secure the support pin assembly to the locating surface of the tooling plate at a predetermined location. The stanchion member has a bore with an opening formed at one end thereof. A sleeve member is at least partially disposed within the bore, and operable to telescope with respect to the stanchion member between a first position and a second position. The sleeve member is infinitely adjustable to lock at any predetermined position between the first and second positions. The support assembly also includes a locator pin that is engaged with the sleeve member at a first end thereof, and configured to mate with the fixture at a second opposing end thereof.

In one aspect of this embodiment, the stanchion member has a first threaded portion on an inner surface thereof, whereas the sleeve member has a second threaded portion on an outer surface thereof that is threadably engaged with the first threaded portion.

According to another aspect, the sleeve member has a blind (i.e., threadless) internal slot formed therein that is configured to receive the locator pin.

In accordance with another aspect of this embodiment, the support pin assembly includes a base plate member attached to the stanchion member, and configured to repositionably attach the support pin assembly to the tooling plate. Ideally, the base plate member defines first and second elongated channels therethrough. Each of the channels is configured to receive at least one bolt whereby the base plate member is attached to the locating surface of the tooling plate.

According to yet another aspect, the support pin assembly includes a locking member configured to lock the sleeve member at any position between the first and second positions. The locking member is preferably a nut with a threaded bore defined therethrough that is threadably engaged with the sleeve member.

In yet another aspect, the support pin assembly also includes a height indicator configured to provide the height of the support pin assembly. To this regard, the height indicator may include a scale (e.g., a ruler) formed in, or attached to an outer surface of the sleeve member.

According to another embodiment of the present invention, a support pin assembly for locating and supporting a fixture on a tooling plate is provided. The tooling plate has a locating surface on one side thereof, and defines a plurality of fastening holes at preselected locations of the locating surface. The support pin assembly includes a stanchion member configured to fixedly secure the support pin assembly to the locating surface of the tooling plate at a predetermined location. The stanchion member defines a substantially cylindrical bore with an opening at one end thereof. The stanchion member has a first threaded portion on an inner-diameter surface. A substantially cylindrical sleeve member is at least partially disposed within the bore. The sleeve member has a second threaded portion on an outer-diameter surface thereof that is threadably engaged with the first threaded portion whereby the sleeve member is operable to telescope with respect to the stanchion member between a first, lowest position and a second, highest position. A locking member is configured to mate with and lock the sleeve member at any predetermined position between the first, lowest position and second, highest position. A locator pin is releasably engaged with the sleeve member at one end thereof, and configured to engage the at least one pinhole in the fixture at an opposing end thereof. That is, the sleeve member preferably has a blind internal slot that is configured to receive the locator pin.

According to one aspect of this particular embodiment, the support assembly includes a base plate member that is fixedly secured to the stanchion member, and configured to attach the stanchion member to the tooling plate in a repositionable manner. Moreover, it is desired that the base plate member define first and second laterally spaced and longitudinally elongated channels therethrough. Each of the channels is configured to receive one or more bolts, each of which is adapted to mate with a respective fastening hole whereby the base plate member is fixedly secured to the locating surface of the tooling plate.

In another aspect of this embodiment, the locking member includes a nut with a threaded bore extending therethrough. The threaded bore of the nut is threadably engaged with the second threaded portion, and thereby configured to lock the sleeve member at the predetermined position.

In accordance with yet another aspect, the support pin assembly includes a height indicator integral with or attached to the sleeve member. The height indicator is configured to provide the overall height of the support pin assembly. The height indicator, for example, may include an axially elongated blind region formed into the threaded portion on the outer-diameter surface of the sleeve member. In this instance, a scale is formed in or attached to the flat region.

In yet another aspect, the locator pin includes a substantially cylindrical body with a protrusion projecting axially outward from one end thereof. The protrusion is configured to engage the at least one pinhole in the fixture.

In accordance with yet another embodiment of the present invention, a tooling plate assembly is provided for locating and supporting a fixture for subsequent mounting to a vehicle frame. The tooling plate assembly includes a planar tooling plate with a locating surface on one side thereof. The tooling plate accurately defines a plurality of fastening holes at preselected locations of the locating surface.

The tooling plate assembly also includes a plurality of support assemblies. Each of the support assemblies includes a stanchion member with a substantially cylindrical bore therein having an opening at one end thereof. The stanchion member has a first threaded portion on an inner-diameter surface thereof. A base plate member is fixedly secured to the stanchion member, and positively attached to the locating surface of the tooling plate at a predetermined location in a repositionable manner. A substantially cylindrical sleeve member is at least partially disposed within the stanchion bore. The sleeve member has a second threaded portion on an outer-diameter surface thereof that is threadably engaged with the first threaded portion whereby the sleeve member is operable to telescope with respect to the stanchion member between a first, lowest position and a second, highest position. The sleeve member also defines an axially elongated blind internal slot therein. A nut with a threaded bore that extends therethrough is threadably engaged with the second threaded portion to thereby lock the sleeve member at any predetermined position between the first and second positions. A substantially cylindrical locator pin is releasably engaged with the blind internal slot of the sleeve member at a first end thereof. The locator pin has a protrusion projecting axially outward from a second opposing end thereof, the protrusion being configured to engage the at least one pinhole in the fixture.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 3 is an exploded perspective-view illustration of the support assemblies shown in FIGS. 2A-2C.

DESCRIPTION OF THE PREFERRED EMBODIMENTS

Figure 1:
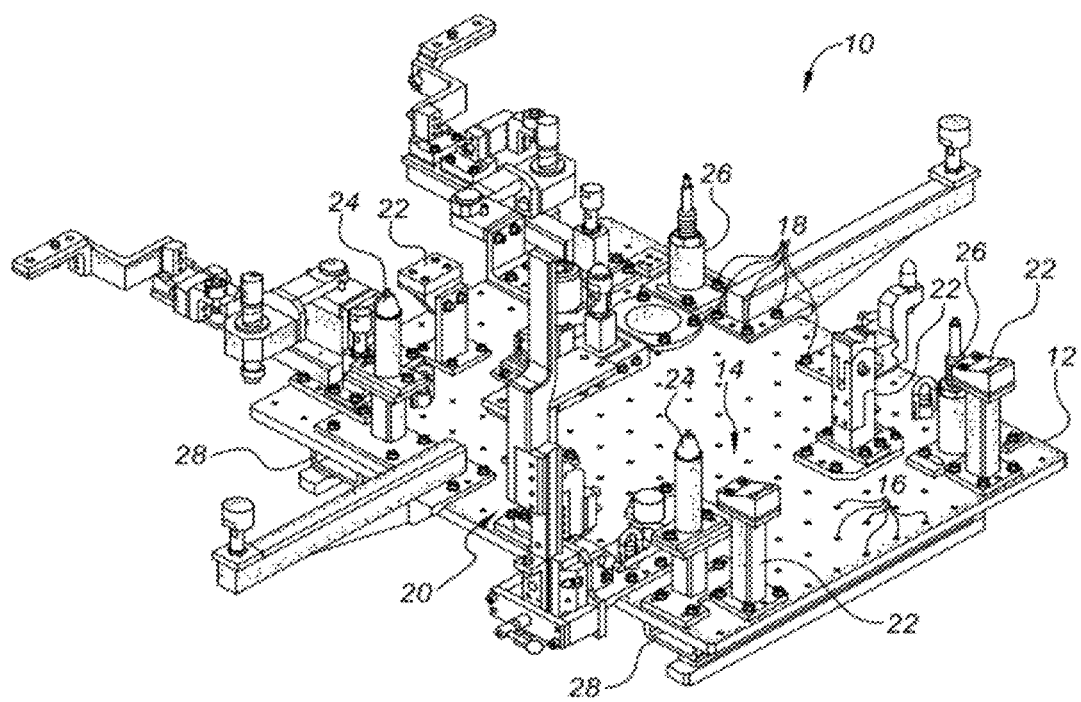
FIG. 1 is an elevated isometric illustration of an exemplary tooling plate assembly with a plurality of support assemblies in accordance with the present invention mounted thereto.

Referring to the drawings, wherein like reference numbers refer to like components throughout the several views, a representative tooling plate assembly with which the present invention may be incorporated and practiced is shown in FIG. 1, identified generally as 10. The tooling plate assembly 10 is intended for use in body-chassis marriage applications in a high volume, flexible manufacturing automobile production plant. It should be readily understood, however, that the present invention may be employed in other manufacturing and assembly operations in the automotive industry, as well as other industries. Moreover, the particular arrangement shown in FIG. 1 is merely provided for exemplary purposes. As such, the present invention is by no means limited to the particular tooling plate configuration shown in the drawings. Finally, the drawings presented herein are not to scale and are provided purely for instructional purposes. Thus, the individual and relative dimensions shown in the drawings are not to be considered limiting.

Referring now to FIG. 1, the tooling plate assembly 10 includes a planar tooling plate or platform 12 (sometimes called a "tooling tray"). The tooling plate 12 is fabricated from a material sufficient to support a fixture or workpiece, such as an internal combustion engine, power transmission, differential, transfer case, etc. (not shown), of an automobile thereon, which includes, but is not limited to, cold rolled steel, electro-galvanized steel, hot-dip galvanized steel, tin free steel, and tin mill black plate steel. The tooling plate 12 has a locating surface 14 on one side thereof, and a plurality of fastening holes 16 accurately formed (e.g., through drilling or tapping) at preselected locations of the locating surface 14. It should be readily recognized that the number, orientation, size, and geometry of the fastening holes 16 may be infinitely varied without departing from the intended scope of the present invention. A pair of U-beams 28 are welded to the rear face of the tooling plate 12 at opposing ends thereof to provide reinforcement, and a means of operatively engaging the tooling plate assembly 10 with a precision locating and lifting apparatus (not illustrated herein).

Each fastening hole 16 is designed, with threads or otherwise, to receive a respective fastening element, such as bolts 18, to connect the base plates of various fixture tools to the tooling plate 12. The fixture tools are represented herein by, but certainly not restricted to, a sword package, generally indicated at 20, an array of engine mounts 22, a pair of PLP pins 24, and a pair of support assemblies 26 (also referred to herein as "support pin assembly") in accordance with the present invention. The number and location of the fixture tools is determined by the design and type of the component (s) to be supported by the tooling plate assembly 10.

Turning now to FIG. 3, an exploded, perspective-view illustration of a single support assembly 26 from FIG. 1 is shown. Each of the support assemblies 26 includes a stanchion 30, a sleeve 32, and a removable and replaceable locator pin 34. The stanchion 30 is shown with a cylindrical body 36 that defines a substantially cylindrical bore 38 extending longitudinally therein, and having an opening at one end thereof. The stanchion member 30 has a first threaded portion 40 which extends longitudinally on an inner-diameter surface thereof (i.e., along the wall of the bore 38). Notably, the shape of the stanchion body 36 is not limited to that of a cylinder, but is shown as such for ease of manufacture and overall simplicity of design.

A generally planar and square base plate member 42 is attached to the stanchion body 36 at the end opposite of the bore opening. According to the embodiment of FIG. 3, the base plate 42 includes a number of counter-sunk bolt holes 44 that extend therethrough, each of which is configured to receive a threaded bolt 46 in a preferably flush-fit manner. The bolts 46, once received by a respective bolt hole 44, pass through the base plate 42 to threadably engage threaded apertures (not visible in this view) in the bottom of the stanchion body 36. It is considered within the scope and spirit of the present invention that the base plate 42 take on additional shapes and dimensions. Furthermore, the means for attaching the base plate 42 to the stanchion 30 may be achieved through other fastening means, such as welding, or, alternatively, fabricating the two elements as a single-piece structure.

The base plate 42 is intended to repositionably fix the stanchion member 30 and, thus, the entire support assembly 26 to the locating surface 14 of the tooling plate 12 at a predetermined location. According to one embodiment of the present invention, the base plate 42 defines first and second laterally spaced and longitudinally elongated channels 48 and 50, respectively, that extend therethrough. Each of the channels 48, 50 is configured to receive one or more bolts 18 (FIG. 1), each of which is adapted to mate with a respective fastening hole 16 whereby the base plate 42 is fixedly secured to the locating surface 14. The first and second channels 48, 50 allow for a certain amount of "play"—freedom to selectively vary the position and orientation of the support assembly 26 without having to completely detach the assembly 26 from the tooling plate 12. To this regard, the length and orientation of each channel 48, 50 may be modified to allow for a particular amount of play. Finally, the base plate 42 may be omitted from the support pin assembly 26, and the stanchion 30 attached directly to the tooling plate locating surface 14 at a predetermined location if a tighter footprint is required.

Figure 2A:
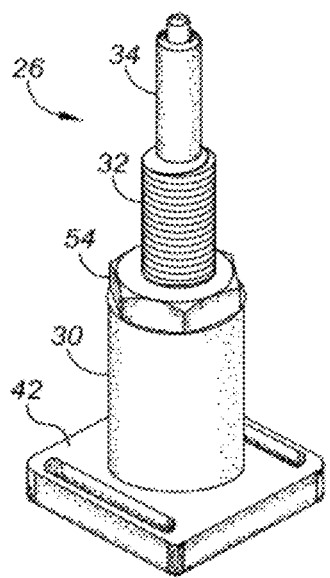
FIG. 2A is an isometric illustration of one of the support assemblies of FIG. 1, depicting the sleeve and pin locked in a highest position.
Figure 2B:
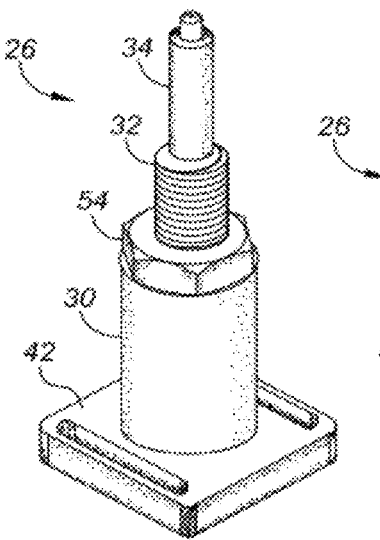
FIG. 2B is an isometric illustration of one of the support assemblies of FIG. 1, depicting the sleeve and pin locked in an intermediate predetermined position.
Figure 2C:
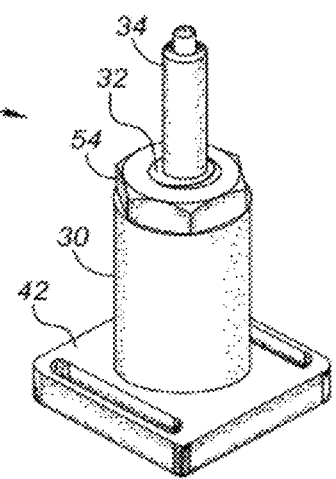
FIG. 2C is an isometric illustration of one of the support assemblies of FIG. 1, depicting the sleeve and pin locked in a lowest position.

The cylindrical sleeve 32 is at least partially disposed within the stanchion bore 38, as seen in FIGS. 2A-2C, and designed to telescope with respect to (i.e., slide in and out of) the stanchion member 30 between a first, highest position, shown in FIG. 2A, and a second, lowest position, seen in FIG. 2C. In accordance with the present invention, the sleeve member 32 is infinitely adjustable to lock at any predetermined position between the first and second positions, one such position shown, for example, in FIG. 2B. For example, the sleeve member 32 has a second threaded portion 52 on an outer-diameter surface thereof that is threadably engaged with the first threaded portion 40 of the stanchion 30. The threaded interplay between the first and second portions 40, 52 allows the sleeve 32 to axially translate in and out of the bore 38, and provides the necessary interface between the stanchion 30 and sleeve 32 to support a fixture at any point between the first and second positions. The second threaded portion 52 is shown covering the entire outer extent of the sleeve member 32. It should be understood, however, that the second threaded portion 52 can cover only certain predetermined segments of the sleeve 32 within the scope of the claimed invention.

Ideally, the support pin assembly 26 also includes a locking member that is operable to lock the sleeve member 32 in position, thereby providing a more resilient engagement between the stanchion 30 and sleeve 32. In one exemplary embodiment, the locking member is a nut 54 with a threaded bore 56 that extends therethrough. By screwing the nut 54 onto the sleeve 32, the threaded bore 56 threadably engages with the second threaded portion 52. Once the sleeve 32 is set to the appropriate height, the nut 54 is tightened so as to press against the flat upper surface of the stanchion 30, and thereby lock the sleeve 32 at any predetermined position (e.g., FIG. 2B) between the highest and lowest positions (e.g., FIGS. 2A and 2C, respectively).

The sleeve 32 has an axially elongated, blind (or threadless) internal slot 58 that is configured to receive the locator pin 34, in a preferably "snug fit" manner. According to one preferred embodiment of the present invention, the locator pin 34 has a substantially cylindrical body 60 that releasably engages with or slots into the blind internal slot 58 of the sleeve member 32 at a first end thereof. The locator pin 34 has a protrusion 62 that projects axially outward from a second opposing end thereof. The protrusion 62 is engineered to engage a complementary pinhole formed in the fixture. The geometries of the locator pin 34 and slot 58 are preferably cylindrical for simplifying fabrication of the assembly 26, but may take on additional geometries so long as the locator pin 34 is tightly held within the sleeve 32. In addition, a locking pin or similar element may also be introduced into the support assembly 26 to secure the locator pin 34 to the sleeve 32. Finally, the second end of the locator pin 34 may take on other shapes than the hemi-spherical protrusion 62 shown in the figures. For example, additional features, such as a side protrusion or a receptacle, can be used to define the pin's rotational orientation with respect to the sleeve member 32.

The support pin assembly 26, to facilitate ease of setup, preferably also includes a height indicator that provides the overall height of the assembly 26—i.e., the distance from the bottom of the base plate 42 to the top of the protrusion 62. In one exemplary embodiment, the height indicator is a scale (e.g., a ruler) 66 integral with or attached to the sleeve member. As seen in FIG. 3, an axially elongated blind region 68, which may have a substantially flat configuration, is formed into the second threaded portion 52 on the outer-diameter surface of the sleeve 32. The scale 66 is either formed in (e.g., laser etched) or attached to (e.g., by adhesives) the blind region 68.

While the best modes for carrying out the present invention have been described in detail, those familiar with the art to which this invention relates will recognize various alternative designs and embodiments for practicing the invention within the scope of the appended claims.

The invention claimed is:

1. A support pin assembly for at least one of supporting and locating a fixture on a tooling plate having a locating surface, the support pin assembly comprising:
   a stanchion member configured to fixedly secure the support pin assembly to the locating surface of the tooling plate at a predetermined location, said stanchion member defining a bore with an opening at one end thereof;
   a sleeve member at least partially disposed within said bore, and operable to telescope with respect to said stanchion member between a first position and a second position, wherein said sleeve member is infinitely adjustable to lock at any predetermined position between said first and second positions;
   a locator pin engaged with said sleeve member at a first end thereof, and configured to mate with the fixture at a second opposing end thereof; and
   a base plate member operatively attached to said stanchion member, and configured to repositionably attach the support pin assembly to the tooling plate.

2. The support pin assembly of claim 1, wherein said stanchion member has a first threaded portion on an inner surface thereof, and wherein said sleeve member has a second threaded portion on an outer surface thereof that is threadably engaged with said first threaded portion.

3. The support pin assembly of claim 1, wherein said sleeve member defines a blind internal slot therein that is configured to receive said locator pin.

4. The support pin assembly of claim 1, wherein said base plate member defines first and second elongated channels therethrough, wherein each of said first and second channels is configured to receive at least one bolt whereby said base plate member is attached to the locating surface of the tooling plate.

5. The support pin assembly of claim 1, further comprising:
   a locking member configured to lock said sleeve member at said predetermined position.

6. The support pin assembly of claim 5, wherein said locking member includes a nut with a threaded bore defined therethrough.

7. The support pin assembly of claim 1, further comprising:
   a height indicator configured to provide the height of the support pin assembly.

8. The support pin assembly of claim 7, wherein said height indicator includes a scale formed in or attached to an outer surface of said sleeve member.

9. The support pin assembly of claim 1, wherein said locator pin includes a substantially cylindrical body with a protrusion projecting axially outward from one end thereof.

10. A support pin assembly for locating and supporting a fixture on a tooling plate having a locating surface on one side thereof, the fixture defining at least one pinhole, and the tooling plate defining a plurality of fastening holes at preselected locations of the locating surface, the support pin assembly comprising:
    a stanchion member configured to fixedly secure the support pin assembly to the locating surface of the tooling plate at a predetermined location, said stanchion member defining a substantially cylindrical bore with an opening at one end thereof, said stanchion member having a first threaded portion on an inner-diameter surface thereof;
    a substantially cylindrical sleeve member at least partially disposed within said bore, and having a second threaded portion on an outer-diameter surface thereof that is threadably engaged with said first threaded portion whereby said sleeve member is operable to telescope with respect to said stanchion member between a first lowest position and a second highest position;
    a locking member configured to mate with and lock said sleeve member at any predetermined position between said first and second positions;
    a locator pin releasably engaged with said sleeve member at one end thereof, and configured to engage the at least one pinhole in the fixture at an opposing end thereof; and
    a base plate member fixedly secured to said stanchion member, and configured to positively attach said stanchion member to the tooling plate in a repositionable manner.

11. The support pin assembly of claim 10, wherein said sleeve member defines a blind internal slot therein that is configured to receive said locator pin.

12. The support pin assembly of claim 10, wherein said base plate member defines first and second laterally spaced and longitudinally elongated channels therethrough, wherein each of said first and second channels is configured to receive at least one bolt, each of said bolts is adapted to mate with a respective one of the plurality of fastening holes whereby said base plate member is fixedly secured to the locating surface of the tooling plate.

13. The support pin assembly of claim 10, wherein said locking member includes a nut defining a threaded bore therethrough that is threadably engaged with said second threaded portion and thereby configured to lock said sleeve member at said predetermined position.

14. The support pin assembly of claim 10, further comprising:
    a height indicator integral with or attached to said sleeve member, said height indicator configured to provide the overall height of the support pin assembly.

15. The support pin assembly of claim 14, wherein said height indicator includes an axially elongated blind region formed into said second threaded portion on said outer-diameter surface of said sleeve member, and a scale formed in or attached to said blind region.

16. The support pin assembly of claim 10, wherein said locator pin includes a substantially cylindrical body with a protrusion projecting axially outward from one end thereof, said protrusion configured to engage the at least one pinhole in the fixture.

17. A tooling plate assembly for locating and supporting a fixture for subsequent mounting to a vehicle frame, the fixture defining at least one pinhole, the tooling plate assembly comprising:

a planar tooling plate including a locating surface on one side thereof, said tooling plate defining a plurality of fastening holes at preselected locations of the locating surface; and a plurality of support assemblies, each of said support assemblies including:

a stanchion member defining a substantially cylindrical bore therein with an opening at one end thereof, said stanchion member having a first threaded portion on an inner-diameter surface thereof;

a base plate member fixedly secured to said stanchion member, and positively attached to said locating surface of said tooling plate at a predetermined location in a repositionable manner;

a substantially cylindrical sleeve member at least partially disposed within said bore, and having a second threaded portion on an outer-diameter surface thereof that is threadably engaged with said first threaded portion whereby said sleeve member is operable to telescope with respect to said stanchion member between a first lowest position and a second highest position, wherein said sleeve member defines an axially elongated blind internal slot therein;

a nut defining a threaded bore therethrough and threadably engaged with said second threaded portion and configured to thereby lock said sleeve member at any predetermined position between said first and second positions; and a substantially cylindrical locator pin releasably engaged with said blind internal slot of said sleeve member at a first end thereof, said locator pin having a protrusion projecting axially outward from a second opposing end thereof, said protrusion configured to engage the at least one pinhole in the fixture.

\* \* \* \* \*